US008656308B2

(12) United States Patent
Shimkin

(10) Patent No.: US 8,656,308 B2
(45) Date of Patent: Feb. 18, 2014

(54) SYSTEM AND METHOD FOR ELECTRONIC ITEM MANAGEMENT

(76) Inventor: Beth Shimkin, Pasadena, CA (US)

( * ) Notice: Subject to any disclaimer, the term of this patent is extended or adjusted under 35 U.S.C. 154(b) by 1401 days.

(21) Appl. No.: 12/018,568

(22) Filed: Jan. 23, 2008

(65) Prior Publication Data

US 2008/0195973 A1    Aug. 14, 2008

Related U.S. Application Data

(60) Provisional application No. 60/897,615, filed on Jan. 26, 2007.

(51) Int. Cl.
*G06F 3/048* (2013.01)
(52) U.S. Cl.
USPC ......................................... 715/838; 715/764
(58) Field of Classification Search
USPC ......................................... 715/764, 738, 838
See application file for complete search history.

(56) References Cited

U.S. PATENT DOCUMENTS

| 6,903,756 B1 | 6/2005 | Giannini |
| 7,089,216 B2 | 8/2006 | Van Overveld |
| 2007/0156513 A1* | 7/2007 | Mastrianni et al. ............. 705/14 |
| 2007/0179916 A1* | 8/2007 | Wan et al. ..................... 705/500 |
| 2008/0065514 A1* | 3/2008 | Eaton .............................. 705/27 |
| 2008/0126962 A1* | 5/2008 | Cook ........................... 715/764 |

FOREIGN PATENT DOCUMENTS

WO     WO 01/29702 A2     4/2001

OTHER PUBLICATIONS

International Search Report dated Aug. 6, 2008 from the International Searching Authority. (3 pages).
Written Opinion dated Aug. 6, 2008 from the International Searching Authority (6 pages).

* cited by examiner

*Primary Examiner* — Thanh Vu
(74) *Attorney, Agent, or Firm* — Christie, Parker & Hale, LLP

(57) ABSTRACT

A method of managing electronic items is provided. User-owned images of items are received and stored to a plurality of virtual closets. Each of the plurality of virtual closets are associated with a specific position in a stack. The stack has a plurality of positions. Retailer-owned images of items are stored in the plurality of virtual closets. An image is displayed in each of the positions of the stack. Each displayed image is selected from a virtual closet of the plurality of virtual closets corresponding with the positions in the stack. A user is allowed to change the displayed image in each of the positions in the stack.

42 Claims, 10 Drawing Sheets

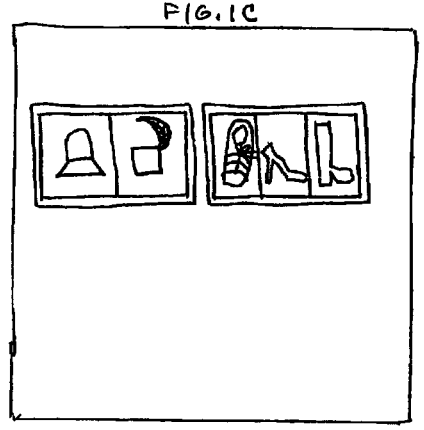
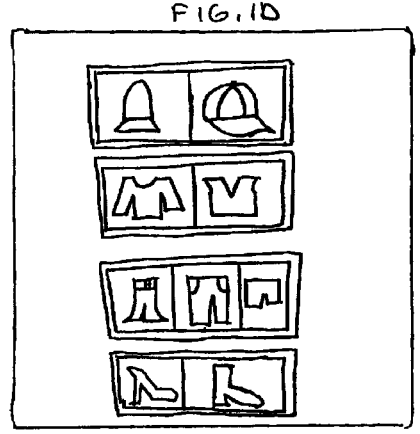

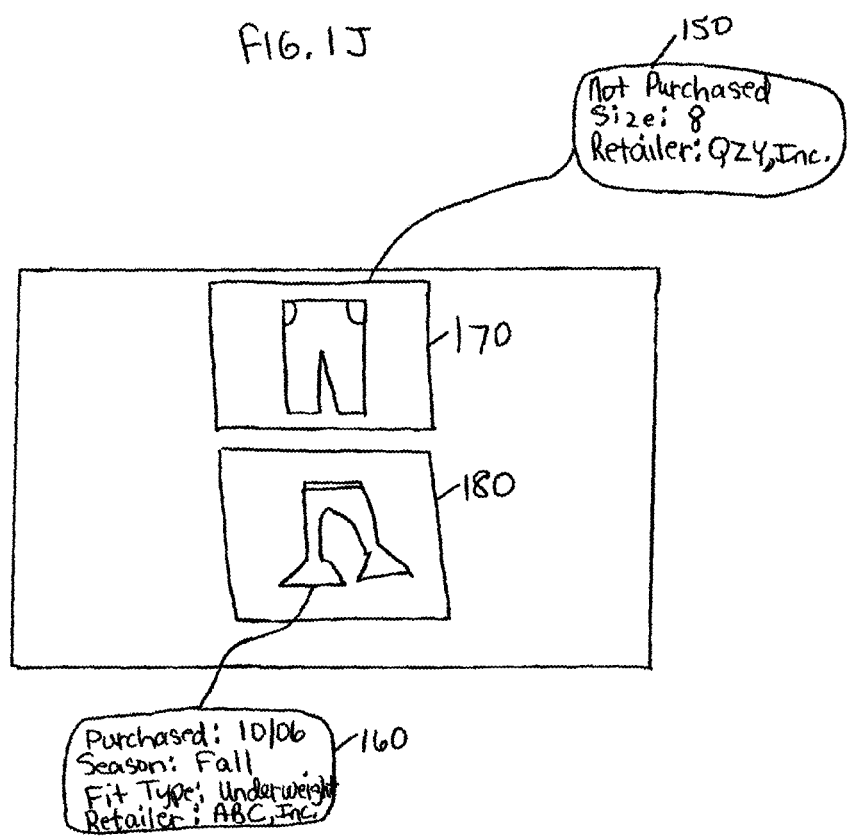

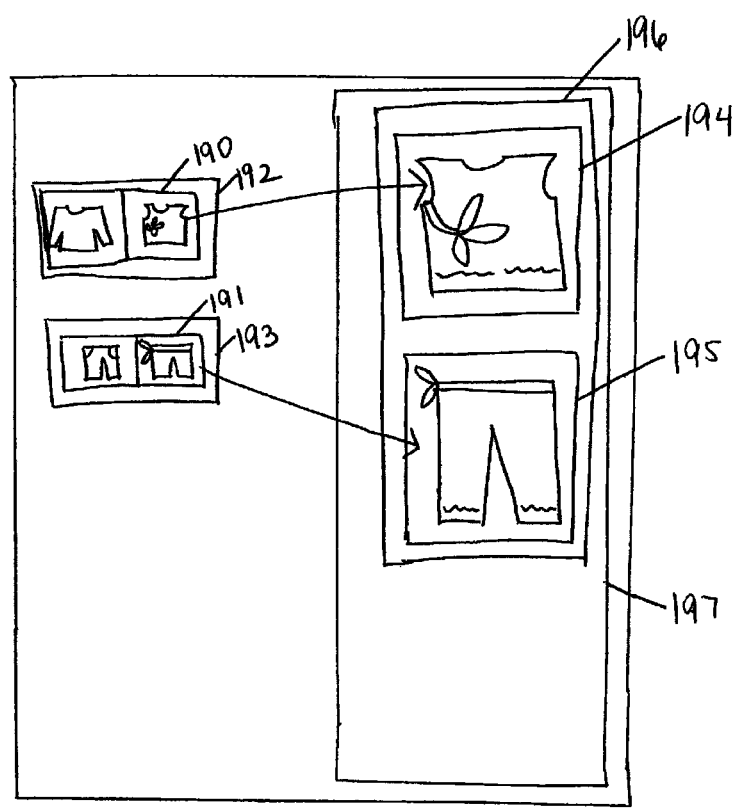

SYSTEM AND METHOD FOR ELECTRONIC ITEM MANAGEMENT

CROSS-REFERENCE TO RELATED APPLICATION(S)

This application claims priority to and the benefit of U.S. Provisional Patent Application Ser. No. 60/897,615, filed on Jan. 26, 2007, the entire content of which is incorporated herein by reference.

BACKGROUND OF THE INVENTION

1. Field of the Invention

The present invention relates generally to item management systems and methods and, more particularly, to a system and method for electronic item management.

2. Description of Related Art

The increasing popularity of fashion has resulted in a plethora of wardrobe items in the brick and mortar closets of shoppers today. Unfortunately, an extensive wardrobe requires extensive and often inconvenient management to remain abreast of the utility of the contents of the wardrobe, to determine which items in the wardrobe fit, to determine which items in the wardrobe are potential coordinates with other items, to determine the desirability of two or more items in a combined outfit and to view the entire wardrobe.

Further, developing an extensive wardrobe often results in numerous hours spent browsing items at or purchasing items from brick and mortar retailer sites or virtual retailer sites.

Finally, a shopper is often unable to determine whether an item in a brick and mortar retail site will coordinate with a currently-owned item or whether the shopper has a currently-owned item that would be duplicated by a purchase at the brick and mortar retailer site. Additionally, a shopper may desire to conveniently search her wardrobe and empty her brick and mortar closet of wardrobe items that are no longer desirable.

Shoppers are confronted with similar issues when selecting furniture or other items for purchase. Accordingly, systems and methods for electronic item management are desirable to address one or more of these or other item-related problems. Such electronic item management systems and methods include wardrobe and furniture management systems and methods.

SUMMARY OF THE INVENTION

A method of managing electronic items is provided. User-owned images of items are received and the user-owned images of items are stored in a plurality of virtual closets. Each of the plurality of virtual closets are associated with a specific position in a stack. The stack has a plurality of positions. Retailer-owned images of items are stored in the plurality of virtual closets. An image is displayed in each of the positions of the stack. Each displayed image is selected from a virtual closet of the plurality of virtual closets corresponding with the positions in the stack. A user is allowed to change the displayed image in each of the positions in the stack.

In an exemplary embodiment of the present invention, a user is allowed to select user-selected images for display in a subset of the positions in the stack. System-selected images are selected randomly for display in a remaining subset of the positions in the stack.

In an exemplary embodiment of the present invention, a user is allowed to select user-selected images for display in a subset of the positions in the stack. System-selected images are selected for display in a remaining subset of the positions in the stack by determining which of the system-selected images match with the user-selected images in the stack.

In an exemplary embodiment of the present invention, determining which of the system-selected images match with the user-selected images in the stack comprises comparing colors, shades, patterns, shapes, and stack position of system-selected images with colors, shades, patterns, shapes, and positions of the user-selected images.

In an exemplary embodiment of the present invention, the stack is a vertical stack.

In an exemplary embodiment of the present invention, the stack is a horizontal stack.

In an exemplary embodiment of the present invention, a user is allowed to change a layout of the stack to a vertical layout, a horizontal layout, or another layout arrangement.

In an exemplary embodiment of the present invention, the electronic items are images of wardrobe, furniture, apparel, accessory, room décor, or other physical items.

In an exemplary embodiment of the present invention, tags in association with the displayed images are displayed. The tags contain information about the items in the images.

In an exemplary embodiment of the present invention, the electronic items are wardrobe items, and each of the plurality of virtual closets are also associated with a type of clothing or accessory, or a color, shade, pattern, shape, price, style time period, material type, specific seasonal time period of year, size, or dress code category.

In an exemplary embodiment of the present invention, each of the plurality of virtual closets may be sorted by a color, shade, pattern, shape, price, style time period, material type, specific seasonal time period of year, size, dress code category, or another defining item characteristic.

An electronic item management system is provided having a processor and a memory operably coupled to the processor. The memory has program instructions stored therein. The processor is operable to execute the program instructions. The program instructions include instructions for receiving user-owned images of items and storing the user-owned images of items in a plurality of virtual closets, each of the plurality of virtual closets being associated with a specific position in a stack, the stack having a plurality of positions; instructions for storing retailer-owned images of items in the plurality of virtual closets; instructions for displaying an image in each of the positions of the stack, each displayed image being selected from a virtual closet of the plurality of virtual closets corresponding with the positions in the stack; and instructions for allowing a user to change the displayed image in each of the positions in the stack.

In an exemplary embodiment of the present invention, the program instructions further include instructions for allowing a user to select user-selected images for display in a subset of the positions in the stack; and instructions for selecting system-selected images randomly for display in a remaining subset of the positions in the stack.

In an exemplary embodiment of the present invention, the program instructions further include instructions for allowing a user to select user-selected images for display in a subset of the positions in the stack; and instructions for selecting system-selected images for display in a remaining subset of the positions in the stack by determining which of the system-selected images match with the user-selected images in the stack.

In an exemplary embodiment of the present invention, the instructions for determining which of the system-selected images match with the user-selected images in the stack includes instructions for comparing colors, shades, patterns, shapes, and stack position of system-selected images with colors, shades, patterns, shapes, and positions of the user-selected images.

In an exemplary embodiment of the present invention, the program instructions further include instructions for allowing a user to change a layout of the stack to a vertical layout, a horizontal layout, or another layout arrangement.

In an exemplary embodiment of the present invention, the program instructions further include instructions for displaying tags in association with the displayed images, the tags containing information about the items in the images.

In an exemplary embodiment of the present invention, the electronic items are wardrobe items, and each of the plurality of virtual closets are also associated with a type of clothing or accessory, or a color, shade, pattern, shape, price, style time period, material type, specific seasonal time period of year, size, or dress code category.

In an exemplary embodiment of the present invention, the program instructions further include instructions for sorting each of the plurality of virtual closets by color, shade, pattern, shape, price, style time period, material type, specific seasonal time period of year, size, dress code category, or another defining item characteristic.

A system and a method of managing electronic items is provided. Images of items are received. The images of items are stored in a plurality of virtual closets. Each of the plurality of virtual closets is associated with a specific position in a stack. The stack has a plurality of positions. An image is displayed in each of the positions of the stack. Each displayed image is selected from a virtual closet of the plurality of virtual closets corresponding with the positions in the stack. A user is allowed to change the displayed image in each of the positions in the stack.

BRIEF DESCRIPTION OF THE DRAWINGS

FIG. 1C is a schematic view of a screenshot of a communication device displaying two horizontally stacked virtual closets.

FIG. 1D is a schematic view of a screenshot of a communication device displaying four vertically stacked virtual closets.

FIG. 1J is a schematic view of a screenshot showing tags for associating information with an image according to an embodiment of the invention.

FIG. 1K is a schematic view of a screenshot showing enlargement of two images.

DETAILED DESCRIPTION

Figure 1:
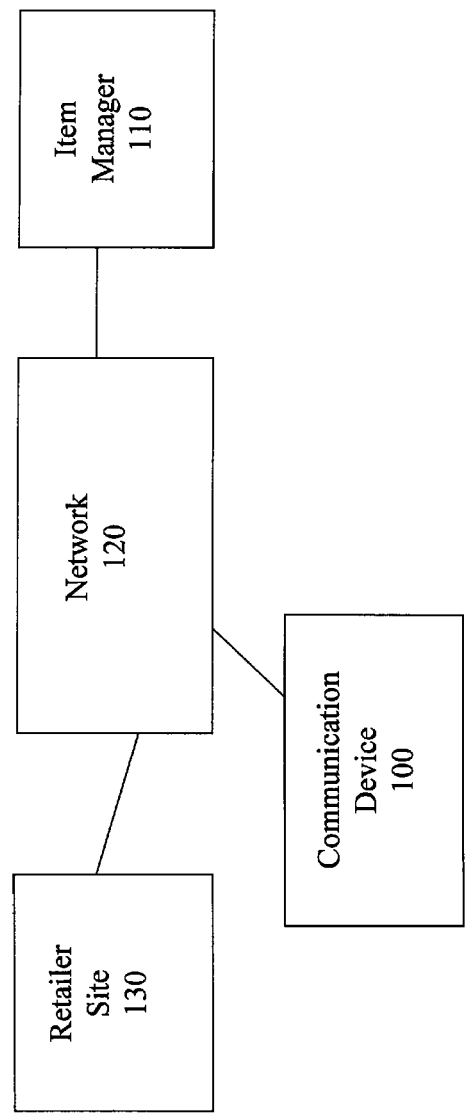
FIG. 1 is a schematic block diagram of an electronic user wardrobe management system according to an embodiment of the invention.

Embodiments of the invention are described below with reference to drawings. These drawings illustrate certain details of specific embodiments that implement the systems, methods and computer program products of the present invention. However, describing the invention with drawings should not be construed as imposing on the invention any limitations that may be present in the drawings. The present invention contemplates methods, systems and program products on any machine-readable media for accomplishing its operations. The embodiments of the present invention may be implemented using an existing processor, or by a special purpose processor incorporated for this or another purpose or by a hardwired system.

The present invention is directed to systems and methods for electronic item management. Electronic item management includes electronic furniture management, electronic accessory management, electronic user wardrobe management, and in general, electronic management of any user-related items. The present invention is described specifically with respect to electronic user wardrobe management systems and methods, but the concepts and ideas of the electronic user wardrobe management systems and methods are applicable generally to electronic item management systems and methods.

FIG. 1 is a schematic block diagram of an electronic item management system according to an embodiment of the invention. In this embodiment, the electronic item management system ("the system") includes a communication device 100, a item manager 110 and a network 120. In some embodiments, the system also includes a retailer site 130. In some embodiments, the communication device is located in close geographical proximity to the item manager. In some embodiments, the communication device is located on the item manager. In some embodiments, the functionality of the communication device and the item manager are combined and function as a single entity.

In some embodiments, the communication device is accessible by a user for performing electronic user wardrobe management functions. As used herein, "electronic user wardrobe management" means one or more of the following: creation of one or more virtual closets for storage of images indicative of wardrobe items that are currently-owned or not currently-owned by the user, storing images of wardrobe items to or removing images of wardrobe items from one or more virtual closets, associating information with one or more of the images of wardrobe items, creating one or more outfits from one or more images of wardrobe items, storing outfits in virtual closets, stacking one or more virtual closets or images, scrolling through the contents of one or more virtual closets, on-screen display of virtual closets or images of wardrobe items, facilitation of on-line purchase of one or more wardrobe items, facilitation of purchase of one or more wardrobe items at a brick and mortar retail store, facilitation of enlarged display of an image placed on an on-screen grid, facilitation of enlarged display of an image generally, transmitting to one or more users images corresponding to wardrobe items or outfits that include multiple wardrobe items, provisioning of a private user webpage, a public user webpage and/or one or more system webpages, which are associated with a webpage for an electronic user wardrobe management system. A wardrobe item may include, but is not limited to, apparel, accessories such as jewelry and hats, literature related to fashion such as fashion magazines, furniture items, room décor and accessories. The communication device is accessible by a user for performing one or more functions concurrently. By way of example, the user may perform scrolling, stacking and searching functions concurrently.

As used herein, the term "stack" means to arrange in a particular configuration. The configuration may include any number of virtual closets or images. Stacked virtual closets or stacked images may be displayed on the communication device. Accordingly, a user controlling the communication device can dynamically control the arrangement of virtual closets (or images).

As used herein, the term "scroll" means to move or move a viewing position relative to one or more graphics or text up or down, right or left or in some other direction, including, but not limited to, a diagonal direction. In various embodiments, the graphics or text may be moved according to any other type of movement as is well-known to those skilled in the art. The information that may be scrolled may include, but is not limited to, one or more virtual closets and the contents thereof or one or more images not stored in a virtual closet. Scrolling may be performed to more than one virtual closet or image concurrently. Alternately, scrolling may be performed on a first virtual closet while not being performed on a second virtual closet notwithstanding both the first virtual closet and the second virtual closet may be displayed on the communication device.

In various embodiments, scrolling through images includes at least one of displaying one or more images associated with a webpage that were not displayed on the webpage before the user request to scroll through the images, displaying one or more images associated with a webpage that were displayed on the webpage before the user request to scroll through the images or displaying one or more images associated with a webpage that were not displayed on the webpage before the user request to scroll through the images and displaying one or more images associated with a webpage that were displayed on the webpage before the user request to scroll through the images.

As used herein, the term "private user webpage" means a webpage associated with the private data of a user. Private data may include, but is not limited to, the user's virtual closets and images that the user has stored in the virtual closets or outfits that the user has created.

As used herein, the term "public user webpage" means a webpage associated with and capable of displaying public data which the user desires to make public to at least one of all internet users or electronic user wardrobe management system members. The public user webpage may be a user's online boutique. Public data may include, but is not limited to, outfits that the user has created, a chat area, images of items that the user is offering for sale, information about items that the user is offering for sale, images of items (or images of outfits) that the user selects for display, personal statistics, wish lists or favorite designers. Accordingly, public data may include private data.

As used herein, the term "system webpage" means a webpage associated with and capable of displaying data of the electronic user wardrobe management system webpage. The data may include, but is not limited to, information representing functionality for accessing one or more retailer sites, information representing functionality for accessing a private user webpage or a public user webpage or one or more coupons offered by the system or by a retailer site. In some embodiments, the system webpage may be a webpage of a retailer site that is a virtual store.

In various embodiments, the images may be of any size, resolution or type and may have any content. In some embodiments, the images are color thumbnail images of wardrobe items. The wardrobe items may be any items, including, but not limited to, pants, fashion magazines, hats, jewelry, scarves, shoes, outerwear, furniture items, room décor and accessories. In some embodiments, the image is an image of the user or of a form such as that of a human.

In some embodiments, the communication device is any device capable of controlling a display device to display graphics or text. In some embodiments, the communication device is any device capable of receiving information for displaying a webpage and displaying the webpage on the communication device. In some embodiments, the communication device is configured to operate according to any number of web-related protocols including, but not limited to, Hyper Text Transfer Protocol (HTTP) and Wireless Application Protocol (WAP). In some embodiments, the communication device is configured to control an email client for composing an email. The email may include one or more images associated with the system. The communication device may be, but is not limited to, a personal computer, a mobile telephone or a personal digital assistant (PDA). Accordingly, the communication device may be mobile, fixed, wireless or wired.

The wardrobe manager includes logic for performing one or more electronic user wardrobe management functions. The wardrobe manager may perform one or more functions concurrently. By way of example, the wardrobe manager may perform scrolling, stacking and searching functions concurrently. The logic may be software-based, hardware-based or a combination of hardware and software.

In some embodiments, the wardrobe manager includes logic for performing one or more functions associated with that of a web server. In other embodiments, the wardrobe manager is a web server.

In some embodiments, the wardrobe manager includes logic for communicating with a retailer site. In some embodiments, the wardrobe manager also includes functionality for transmitting to the communication device information related to user wardrobe management including, but not limited to, images of, pricing for, availability of, or sizes of one or more wardrobe items. In some embodiments, the information transmitted to the communication device is stored on the wardrobe manager. In various embodiments, the information transmitted to the communication device is previously stored, recently retrieved from a retailer site or other location, stored before transmission to the communication device, or not stored before transmission to the communication device.

The retailer site may be a virtual store or a brick and mortar store having one or more wardrobe items featured at the store. The retailer site may be configured to communicate with the wardrobe manager. The retailer site may transmit to the wardrobe manager information related to user wardrobe management including, but not limited to, images of, pricing for, availability of or sizes of one or more of its items. In some embodiments, the retailer site transmits information to the wardrobe manager after receiving a request for the information from the wardrobe manager.

In some embodiments, the network is the Internet. The communication device and the wardrobe manager may each connect to the network by any suitable technology. By way of example, but not limitation, the connection to the network may be wireless transmission media, cable technology or any other transmission media that support data communication protocols such as Internet Protocol (IP), Asynchronous Transfer Mode (ATM), or the like. A person skilled in the art will appreciate that one or more of the communication device, the wardrobe manager, or the retailer site may also be interconnected to one another over private networks such as private local area networks or the like.

The system is configured to perform one or more functions of electronic user wardrobe management. The system may perform one or more functions concurrently. By way of example, the system may perform scrolling, stacking, and searching functions concurrently.

By way of another example, the system may perform transmitting to one or more users images corresponding to wardrobe items or outfits that include multiple wardrobe items. The images may be transmitted by any number of methods, including, but not limited to, transmission as part of electronic mail ("email") over the network. In various embodiments, an email including one or more images associated with the system, and including the image as part of its body or as an attachment, may be sent from a first user associated with the system to a second user or a first location. The second user may be a member of the system or anyone able to access email. The first location may be a website repository, a message board or any other location having the ability to receive and/or to display images. In some embodiments, a user can initiate the transmission of an image from the communication device.

The electronic user wardrobe management functions may be accomplished with standard programming techniques or circuitry using rule based logic and/or other logic.

Figure 1A:
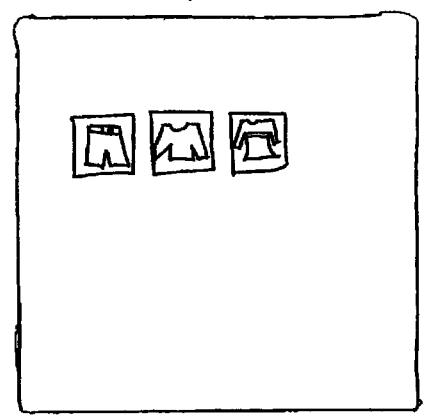
FIG. 1A is a schematic view of a screenshot of a communication device displaying three horizontally stacked images.
Figure 1B:
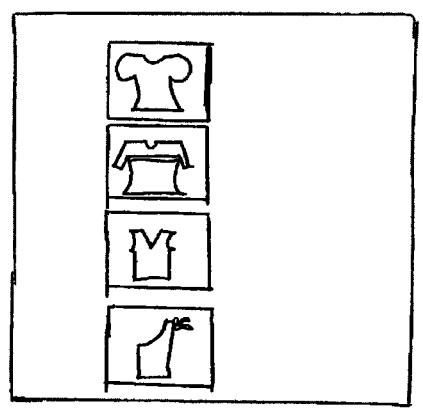
FIG. 1B is a schematic view of a screenshot of a communication device displaying four vertically stacked images.

FIG. 1A is a schematic view of a screenshot of a communication device displaying three horizontally stacked images. FIG. 1B is a schematic view of a screenshot of a communication device displaying three vertically stacked images. FIG. 1C is a schematic view of a screenshot of a communication device displaying two horizontally stacked virtual closets, the first virtual closet having two images stored in the closet and the second virtual closet having three images stored in the closet.

Figure 1E:
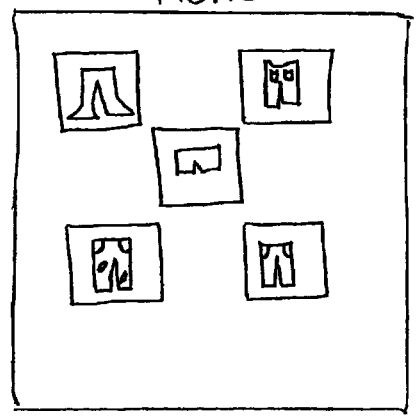
FIG. 1E is a schematic view of a screenshot of a communication device displaying five images stacked in a star configuration.
Figure 1F:
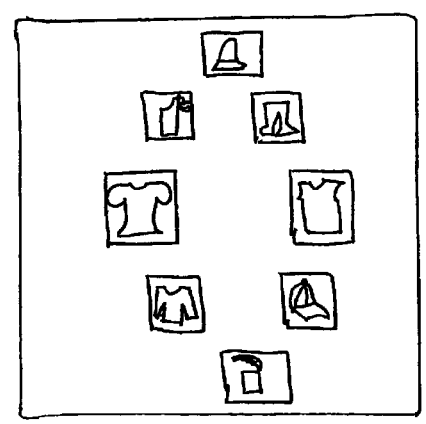
FIG. 1F is a schematic view of a screenshot of a communication device displaying eight images stacked in a circle configuration.

FIG. 1D is a schematic view of a screenshot of a communication device displaying three vertically stacked virtual closets. The topmost closet includes two images (corresponding to two wardrobe items), the closet immediately below the topmost closet includes two images (corresponding to two wardrobe items), the bottommost closet includes two images (corresponding to two wardrobe items) and the closet immediately above the bottommost closet includes three images (corresponding to three wardrobe items). FIG. 1E is a schematic view of a screenshot of a communication device displaying five images stacked in a star configuration. FIG. 1F is a schematic view of a screenshot of a communication device displaying eight images stacked in a circle configuration.

Figure 1G:
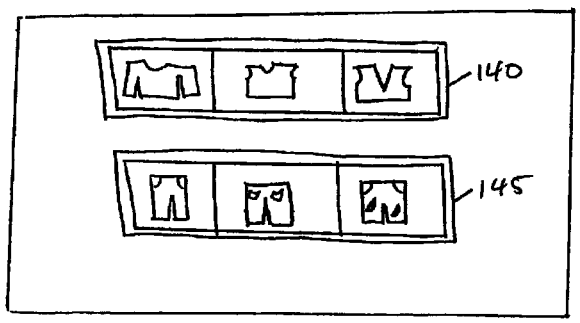
FIGS. 1G, 1H and 1I are schematic views of screenshots showing scrolling of images in virtual closets.
Figure 1H:
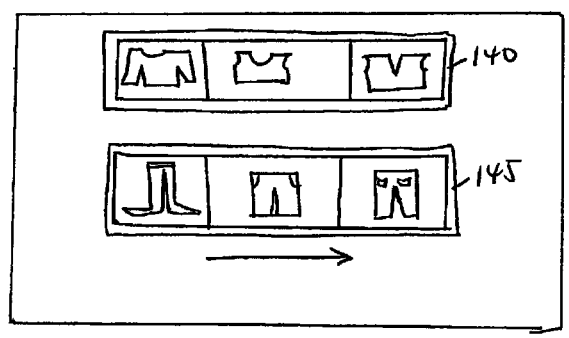
Figure 1I:
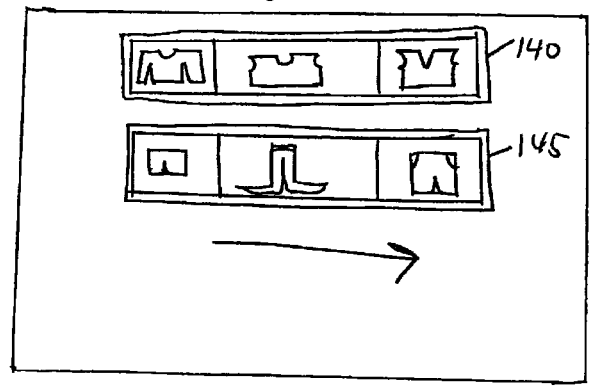

FIGS. 1G-1I are schematic views of screenshots showing scrolling of images in virtual closets. In FIGS. 1G-1I, two vertically stacked virtual closets having associated images are displayed. As shown in FIGS. 1G-1I, a first virtual closet 140 is not scrolled while a second virtual closet 145 is scrolled left to right. Accordingly, a user can determine whether items coordinate.

In one embodiment of the system of FIG. 1, a user is located at communication device 100 and the wardrobe manager 110 executes software allowing it to perform the functions that the system is capable of performing. The user has stored one or more images corresponding to wardrobe items at a location on the network accessible by the wardrobe manager 110. The images include images of wardrobe items that are currently-owned by the user and images of wardrobe items that are not currently owned by the user.

The user previously photographed various wardrobe items and saved corresponding images of the items electronically. The user has browsed virtual retailer sites that the user accessed through a link at the system webpage. While browsing the virtual retailer sites, the user has selected various images corresponding to desirable wardrobe items that are not currently-owned by the user.

The user sends a request to the wardrobe manager to store in one of two virtual closets that the user has created, one or more images selected by the user from either the user's personal wardrobe or from a retailer site. The user also sends a request to categorize the virtual closets by the type of clothing depicted by the image that the user stores in each of the virtual closets.

The wardrobe manager receives the request and stores each of the selected images in the selected virtual closets. The wardrobe manager sends to the communication device operated by the user an updated private user webpage configured to display the virtual closet and the images associated with the virtual closet substantially inside the on-screen boundaries of the virtual closet.

The user sends a request to the wardrobe manager to stack the virtual closets horizontally. The wardrobe manager stacks the images by updating a webpage for on-screen display of the virtual closets substantially horizontally aligned such as that shown in FIG. 1C. The wardrobe manager then sends the updated webpage file to the communication device. The communication device displays the webpage illustrating the horizontally stacked virtual closets.

The user sends a request to the wardrobe manager to scroll the images in only one of the virtual closets. The wardrobe manager updates one or more webpages for on-screen display of the images in the virtual closets substantially scrolled from a first position to a second position while maintaining the images of the other virtual closet in a same position. The communication device receives the webpages and displays on-screen scrolling in a manner such as that shown in FIGS. 1G, 1H and 1I.

The user sends a request to the wardrobe manager to concurrently stack the virtual closets horizontally and scroll the images in one of the virtual closets from left to right across the screen of the communication device.

The wardrobe manager stacks the images by updating one or more webpages for on-screen display of the virtual closets substantially horizontally aligned and displaying on-screen scrolling of images in one virtual closet such as that shown in FIGS. 1G, 1H and 1I. The wardrobe manager then sends the updated webpage files to the communication device. The communication device displays the webpage illustrating the horizontally stacked virtual closets with scrolling of one of the images in the virtual closets.

One embodiment of a method of the system configured to perform electronic user wardrobe management is as follows. The communication device receives information indicative of a user request for electronic user wardrobe management. The network transmits the information indicative of the user request from the communication device to the wardrobe manager. The wardrobe manager receives the information indicative of the user request and performs the function associated with the user request. In some embodiments, the wardrobe manager transmits to the communication device information after performing the function.

In various embodiments, the user request may include, but is not limited to, a request for creation of multiple virtual closets, categorization of virtual closets, tagging of images corresponding to wardrobe items, stacking virtual closets or images, or scrolling through one or more virtual closets or images.

The information transmitted from the wardrobe manager to the communication device may be a confirmation that the user request was received, a confirmation that the function was performed, information indicative of the contents of a webpage resulting from the performed function, information requested by the user such as the price of a potential wardrobe item, or any other wardrobe-related information.

Figure 2:
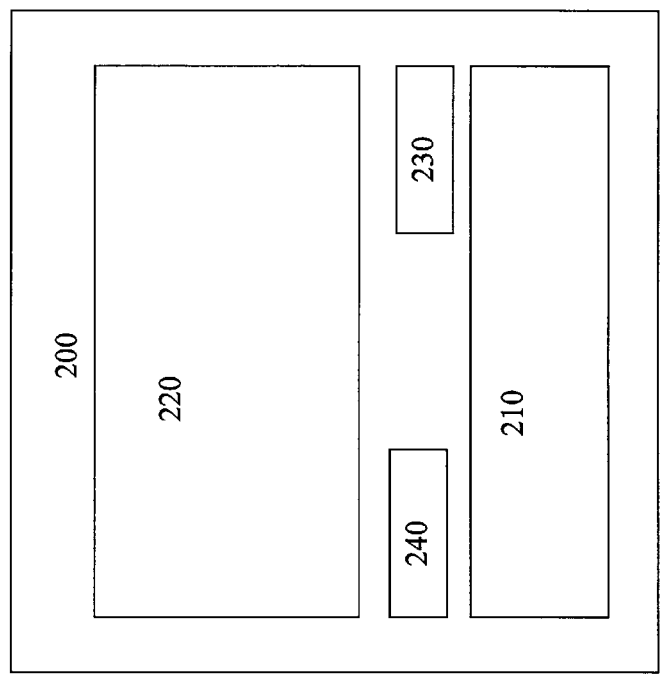
FIG. 2 is a schematic block diagram of a communication device of the electronic user wardrobe management system according to one embodiment of the invention.

FIG. 2 is a schematic block diagram of a communication device 200 of the electronic user wardrobe management system according to one embodiment of the invention.

In some embodiments, the communication device 200 includes a processor 240, an input device 210, a display device 220, and memory 230. In other embodiments, the communication device 200 merely includes a processor 240, an input device 210, and memory 230 as the communication device 200 is only for performing electronic user wardrobe management but not for viewing any results of electronic user wardrobe management. Yet, in other embodiments, the communication device 200 merely includes a processor 240, a display device 220, and memory 230 as the communication device is only for viewing electronic user wardrobe management but not for performing any further electronic user wardrobe management.

In some embodiments, the processor 240 includes logic for processing input received from the user and for controlling the communication device according to the processed input. In some embodiments, the processor 240 includes logic for processing information received from the wardrobe manager. In some embodiments, the processor 240 includes first interface logic configured to provide a user interface accessible by the wardrobe manager. In some embodiments, the processor 240 includes second interface logic configured to provide a user interface for allowing a user to access a database on the system. The user may be able to store the user's personal images on the database.

In some embodiments, the processor 240 includes logic for processing information indicative of the contents of the private user webpage, the public user webpage or the system webpage. The processor 240 may cause the display of the webpage. The processor 240 may also include logic for interacting with the memory to execute an electronic user wardrobe management system computer program product.

The processor 240 may also include logic for interacting with the memory 230 to retrieve information stored on the memory 230. The information may include, but is not limited to, images of one or more wardrobe items. Each of the wardrobe items may be an item that the user currently owns or an item that the user does not currently own.

The processor 240 may be software-based, hardware-based or a combination of software and hardware. The input device 210 is electrically coupled to the communication device 200. The input device 210 may be wired or wireless. The input device 210 may be, but is not limited to, a mouse, a touchscreen, a keyboard, a keypad or an audio-controlled device. In some embodiments, input is provided through input devices by a user dragging and dropping, providing alphanumeric input or voice commands, selecting an item of a menu, depressing radio buttons or any other method. Other methods of providing input are well-known to those skilled in the art and all such methods are envisaged herein.

The input device 210 is configured to receive inputs from the user. Inputs may include, but are not limited to, user requests for functions related to electronic user wardrobe management or user requests to upload or download one or more images currently-owned by the user or not currently-owned by the user. Users may download modules containing virtual closets of items not currently-owned by the user in order to make comparisons between other items, such other items being items that may be owned or not owned by the user. The modules may be downloaded from retail websites or downloaded from the system website if the modules were uploaded or located on the system website by the retail sites.

The user may be located at the communication device 200 or at a location remote from the communication device 200.

The memory 230 is configured to store information to be used for electronic user wardrobe management. The information may include, but is not limited to, images of one or more wardrobe items, or a computer program product accessible by the processor for performing the functions of the processor. The memory 230 may be any number of suitable types of memory, and may include, but is not limited to, read only memory (ROM) or random access memory (RAM).

The display device 220 is electrically coupled to the communication device 200. The display device 220 may be configured to display graphics that may include, but are not limited to, thumbnail images of wardrobe items, webpage icons or animation such as scrolling of virtual closets or image. In some embodiments, the display device 220 is configured to display the private user webpage, the public user webpage or the system webpage associated with the user wardrobe management system. In one embodiment, the display device 220 is configured as a web browser for displaying the private user webpage, the public user webpage, or the system webpage.

In some embodiments, the communication device 200 is configured to transmit information to and receive information from the wardrobe manager. The communication device 200 may be configured to send a query for information to the wardrobe manager. The query may include information indicative of a user request related to electronic user wardrobe management. The user request may include a request for performing one or more functions related to electronic user wardrobe management.

In some embodiments, the communication device 200 is configured to receive input from a user and function in a manner indicative of the input. The communication device 200 may also be configured to transmit a user request requesting a webpage related to electronic wardrobe management. The user request may be transmitted to the wardrobe manager.

In some embodiments, the user request is to stack one or more virtual closets. The request may be to stack the virtual closets horizontally, vertically, or in some other configuration. The user may make such a request by providing input at the communication device 200 to stack the virtual closets. In one embodiment, the user stacks displayed virtual closets by dragging and dropping one or more virtual closets displayed on the display device 220 into a particular position on the display device 220.

In some embodiments, the user request is to display one or more virtual closets in a stacked configuration. The request may be to display a webpage with one or more virtual closets in a stacked configuration.

In some embodiments, the user request is to stack one or more images associated with one or more virtual closets. The stacking may be dynamically changeable. The request may be to stack the images horizontally, vertically or in some other configuration. The user may make such a request by providing input at the communication device to stack the one or more images. In one embodiment, the user stacks displayed images by dragging and dropping one or more images into a position on the display device.

In some embodiments, the user request is for the system to display one or more images in a stacked configuration. The request may be to display a webpage with one or more images in a stacked configuration.

In another exemplary embodiment, the user request is for the system to display a plurality of images randomly in a stacked configuration, with the images chosen randomly from a virtual closet associated with a certain stack position. For example, if a stack contains first and second vertically stacked virtual closets, the system will randomly choose an image from the first virtual closet to be displayed above a randomly chosen image from the second virtual closet.

In some embodiments, the user request is to scroll through one or more images associated with one or more virtual closets. The user can control the number of images through which scrolling occurs and the direction of scrolling. The request may be to scroll through the images from right to left or left to right if images are stacked horizontally. The request may be to scroll through the images up to down or down to up if images are stacked vertically.

The user request may be to scroll through images associated with a virtual closet. The user request may be to concurrently scroll through images in more than one virtual closet.

In some embodiments, the user request is to associate one or more images with a virtual closet. In some embodiments, the user associates an image with a virtual closet by causing the image to be stored in the storage space allocated to the virtual closet. In some embodiments, the user associates an image with a virtual closet by providing input that causes the virtual closet to be electronically associated with a file that includes the image. In some embodiments, an image is associated with a virtual closet when the virtual closet is configured to display the image when the virtual closet is displayed or when a user scrolls through images of a virtual closet.

In some embodiments, the user request is to create one or more virtual closets. In some embodiments, the user request is to define a category of a virtual closet. By way of example, but not limitation, the user may define a category of a virtual closet to be one or more of pants, shirts, skirts, hats, jewelry, fashion magazines, shoes, or outerwear. By way of another example, but not limitation, the user may intend the content of the virtual closet to be one or more of wardrobe items appropriate for wear during the summer season, wardrobe items appropriate for wear during the fall season, wardrobe items appropriate for wear during the winter season, or wardrobe items appropriate for wear during the spring season. By way of another example, but not by limitation, the user may define categories of closets as apparel (e.g., dresses, pants, children's clothing), fashion-related products (e.g., fashion magazines), beauty products (e.g., cleansers, lipsticks, makeup brushes), or household goods (e.g., microwave ovens, portable radios).

In some embodiments, the user request is to associate information about the status of an item corresponding to an image. The image may be stored in a virtual closet or merely displayed as part of the webpage. By way of example, but not limitation, a user may associate a size, season, whether an image is for a wardrobe item that the user may be able to fit if the user is over the user's ideal weight, whether an image is for a wardrobe item that the user may be able to fit if the user is under the user's ideal weight, the date and location of purchase or whether the item is purchased or merely of interest to the user.

FIG. 1J is a schematic view of a screenshot showing tags for associating information with an image according to an embodiment of the invention. In the embodiment shown, tags 150, 160 are for associating information with images 170, 180, respectively. In some embodiments, the image may be stored in a virtual closet or merely displayed as part of the webpage or in a workspace on the webpage. In some embodiments, the information is associated with an image by the retailer site or by the wardrobe manager.

By way of example, but not limitation, the user, wardrobe manager or retailer site may associate any information with an image. In some embodiments, the user request is to perform a search of items associated with the user. In some embodiments, the user request is to perform a search of items stored in one or more virtual closets. In some embodiments, for example, the user may provide the category of the virtual closet and the desired season to retrieve images of items in the selected closet that are appropriate for wear during the desired season. In one embodiment, the user may search a pants closet for pants suitable for wear during the summer season.

In some embodiments, the user request is to create and/or store one or more outfits in one or more virtual closets. The user request may be to initiate a purchase of one or more items. The one or more items may be stored in a virtual closet, merely displayed on a webpage or merely accessible for on-line purchase by the user. In some embodiments, upon clicking on an image, the user may be taken to the system webpage that may serve as a portal to retailer sites from which the user can purchase the item. The system webpage may also provide a coupon that can be applied to the purchase price of the item. In some embodiments, the user may be able to purchase the item through an online store located within the user wardrobe management system.

The user request may be to enlarge an image. The image may be displayed on the communication device. In some embodiments, the user may enlarge an image by inputting information configured to cause the wardrobe manager to show the image in an enlarged fashion. In one embodiment, the user inputs information requesting an enlarged figure by moving the image into a region of a webpage displayed on the communication device. In some embodiments, the region may include an on-screen grid on which the image is shown in an enlarged form as compared to the previous smaller size of the image. In another embodiment, the background of the workspace on which the stackable images are located and which surrounds each of the stackable images may be changed in color and/or pattern by selecting one of a plurality of colors and/or patterns in a palette.

FIG. 1K is an illustration of a schematic view of a screenshot showing enlargement of two images. In the embodiment shown, the images 190, 191 are stored in virtual closets, 192, 193, respectively. The two images are enlarged as a result of a user request for enlargement, and are shown as enlarged images 194, 195. The wardrobe items corresponding to the images 194, 195 (or any images whether enlarged or not enlarged) may be selected to be a part of an outfit 196. The outfit may be stored in a virtual closet as an outfit.

In some embodiments, the images that the outfit includes are shown stacked to more easily view the aesthetic appeal of the outfit. One or more outfits can be stored in the virtual closets and later viewed on the user's webpage. In various embodiments, a user request may be for performing any number of functions related to electronic user wardrobe management.

One embodiment of a method of performing electronic user wardrobe management by the communication device is as follows. The communication device receives and processes input related to electronic user wardrobe management. The communication device transmits information indicative of the received and processed input. The communication device receives information indicative of a webpage for display on the communication device. The contents of the webpage may be indicative of the input. The communication device displays the webpage associated with the received information that was indicative of the webpage.

The input may be received from a user that may be located at the communication device or at a location remote from the communication device. Alternately, the input may be received from the wardrobe manager or from any other component of the system.

Another embodiment of a method of performing electronic user wardrobe management by the communication device is as follows. The communication device receives information indicative of a webpage associated with the electronic user wardrobe management system. The communication device displays the webpage.

Another embodiment of a method of performing electronic user wardrobe management by the communication device is as follows. The communication device receives information indicative of one or more images for processing by the electronic user wardrobe management system. The communication device facilitates storage of the information. The communication device may facilitate storage of the information by storing the information in its memory. Alternately, the communication device may facilitate storage of the information by transmitting the information to a remote location that is within the system. In some embodiments, the remote location is not within the system.

One embodiment of a method of a user performing electronic user wardrobe management is as follows. The user inputs a user request for an electronic user wardrobe management function. The function may be any number of functions related to user wardrobe management, including, but not limited to, stacking virtual closets or images, scrolling through virtual closets, searching for wardrobe items associated with images accessible by the system, tagging images associated with wardrobe items, purchasing a wardrobe item, constructing a chat message, posting an outfit for sale, accessing the private user webpage, accessing the public user webpage, accessing the system webpage. In some embodiments, the user may also view a webpage displaying a response to the user request. In some embodiments, the user may merely receive a confirmation that the user request was received.

Figure 3:
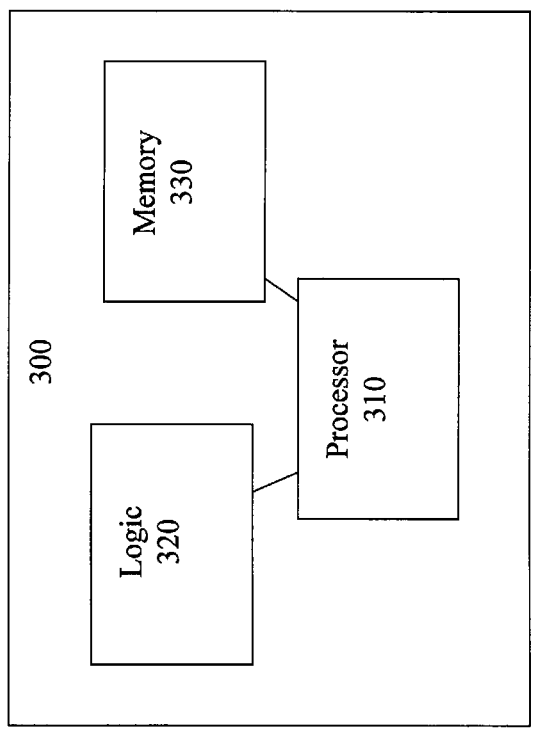
FIG. 3 is a schematic block diagram of a wardrobe manager according to an embodiment of the present invention.

FIG. 3 is a schematic block diagram of a wardrobe manager 300 according to an embodiment of the present invention. In some embodiments, the wardrobe manager 300 includes a processor 310, logic 320, and memory 330. The logic 320 may be software-based, hardware-based or a combination of hardware and software. The memory 330 may be any type of suitable memory and may be configured to store information related to a user's electronic user wardrobe management. In one embodiment, a database stores information related to a user wardrobe management, including, but not limited to, images associated with wardrobe items.

In some embodiments, the logic 320 is configured for performing one or more functions of electronic user wardrobe management. In some embodiments, the logic 320 is configured for performing one or more functions associated with that of a web server. In some embodiments, the wardrobe manager 300 is a web server. The wardrobe manager 300 may also include logic 320 configured for causing the wardrobe manager 300 to perform the functions of an email server or to communicate with an email server for transmitting one or more images associated with the system. In some embodiments, the logic 320 is configured for communicating with a retailer site. In some embodiments, the logic 320 is configured for communicating with the communication device. In some embodiments, the logic 320 is configured to transmit to the communication device information related to user wardrobe management including, but not limited to, images of, pricing for, availability of or sizes of one or more wardrobe items. The information may be information that the user has requested. For example, the user may have identified an image of a wardrobe item of interest available at a retailer site for purchase, and the user may transmit to the wardrobe manager 300 a request for information regarding the item. Alternately, in some embodiments, the wardrobe manager 300 or a retailer site may transmit information to a user automatically upon identifying an item of probable interest to the user.

In some embodiments, the logic 320 of the wardrobe manager 300 is configured for storing on the wardrobe manager 300 the information transmitted to the communication device. In some embodiments, the logic 320 of the wardrobe manager 300 is configured for retrieving information related to electronic user wardrobe management that was previously-stored on the wardrobe manager 300 before the user requested the information. In various embodiments, the information transmitted to the communication device is previously-stored, not previously-stored, recently retrieved from a retailer site or other location, stored before transmission, or not stored before transmission.

In some embodiments, the logic 320 of the wardrobe manager 300 is configured for receiving from the user images of wardrobe items that the user owns. The user may have captured the image of the wardrobe item through any method known to those skilled in the art, such as by taking a picture of the wardrobe item with a digital camera. In some embodiments, the wardrobe manager 300 includes logic for retrieving the image from a stored location, such as a location accessible over the network of the system. In some embodiments, the wardrobe manager 300 includes logic for receiving from the user information indicative of the image.

In another embodiment, the logic 320 of the wardrobe manager 300 determines best matches between items the user does not own and items the user owns and displays the best matches. The logic 320 also determines best matches given one or more items to which a match must be determined. That is, a user may select one or more items from items the user owns and items the user does not own, and the logic 320 of the wardrobe manager 300 will determine best matches to those items. The best matches determined may be from items the user owns or from items the user does not own. The wardrobe manager 300 may provide the user an option to direct the wardrobe manager 300 to choose either from items the user owns or items the user does not own. The wardrobe manager 300 may employ color, shade, pattern, shape, and stack position comparison software to determine best matches to particular items. The wardrobe manager 300 may also randomly generate matches. The wardrobe manager 300 may also provide the user options to control the comparison software and parameters for matching of items.

In some embodiments, the wardrobe manager 300 may process the image of the wardrobe item that the user owns and may process images of wardrobe items that the user does not own. By way of example, but not limitation, the wardrobe manager 300 may include logic for stacking, storing in one or more virtual closets, scrolling, searching, tagging, creating an outfit using a plurality of images wherein the plurality of images includes images that are currently-owned by the user and not currently-owned by the user. Accordingly, the system may allow the user to determine if an item offered by a retailer site coordinates with an item that the user currently owns.

In addition, the wardrobe manager 300 may include logic for sorting items within a virtual closet based on a particular characteristic or multiple characteristics of the items within the virtual closet, the characteristics including colors, shades, patterns, shapes, and other conceivable defining characteristics, such as price, style time period, seasonal time period, material type, seasonal type, size, and dress code category (e.g., formal, business attire, business casual, casual, club style, beach attire, etc.).

By way of example, but not limitation, the wardrobe manager 300 may include logic for stacking, storing in one or more virtual closets, scrolling, searching, tagging, creating an outfit using a plurality of images wherein the plurality of images includes images that are currently owned by the user. Accordingly, the wardrobe manager 300 may allow the user to conveniently organize an entire existing wardrobe into separate virtual closets. Additionally, the wardrobe manager 300 may allow the user to conveniently view her entire existing wardrobe. The user may do so by scrolling through virtual closets and/or images associated with the system.

Additionally, the wardrobe manager 300 may allow the user to conveniently search through her entire wardrobe to determine its contents by season, size, etc. and/or to identify items that the user can no longer fit and desires to offer for sale on the public user webpage. Additionally, the wardrobe manager 300 may allow the user to conveniently determine if items coordinate with items currently-owned or not currently-owned by stacking one or more images or virtual closets.

In some embodiments, the wardrobe manager 300 is configured to stack one or more virtual closets (or one or more images associated with a virtual closet). The virtual closets (or images) may be stacked horizontally, vertically or in some other configuration. Accordingly, the wardrobe manager 300 can dynamically arrange one or more virtual closet (or one or more images).

In one embodiment, the wardrobe manager 300 performs stacking after a user requests stacking. In some embodiments, the information indicative of the request for stacking is generated and transmitted to the wardrobe manager 300 as a result of the user dragging and dropping each virtual closet or image. Such information may be received by the wardrobe manager 300 and processed to cause the one or more virtual closets (or one or more images) to be stacked.

The wardrobe manager 300 may also process and transmit information to the communication device for displaying a webpage showing one or more virtual closets (or one or more images) in a stacked configuration. The wardrobe manager 300 may process and transmit information to the communication device for displaying the webpage before or after updating the webpage with information generated as a result of the user request.

In various embodiments, the wardrobe manager 300 may perform a function as a result of information that the wardrobe manager 300 receives that is indicative of a user input requesting user wardrobe management function. The function may be performed by the wardrobe manager 300 and the result of the function displayed at a private user webpage, a public user webpage or a system webpage associated with the user wardrobe management system.

In some embodiments, the wardrobe manager 300 is configured to perform scrolling through of one or more virtual closets (or one or more images associated with one or more virtual closets). The wardrobe manager 300 can control the number of virtual closets (or images) through which scrolling occurs and the direction of scrolling. For example, scrolling may be left to right or right to left in a horizontally displayed closet or up or down in a vertically displayed closet. In some embodiments, the wardrobe manager 300 controls the manner of scrolling after receiving user input indicative of the desired manner of scrolling.

In some embodiments, the wardrobe manager 300 is configured to receive from a communication device information indicative of a user request to create one or more virtual closets. The one or more virtual closets provide for user storage of one or more images corresponding to one or more wardrobe items. In some embodiments, the request includes information indicative of the identity of the user and the number of virtual closets that the user desires to create. The wardrobe manager 300 is configured to create one or more virtual closets. In some embodiments, the user request may also include a designation of the types of wardrobe items for which images will be stored in association with the virtual closet.

The wardrobe manager 300 may be configured to create a virtual closet by allocating storage space for the virtual closet. In some embodiments, the storage space is located on the wardrobe manager 300. In some embodiments, the storage space is located at a location remote from but accessible by the wardrobe manager 300. In various embodiments, the storage space may be allocated to the user for a selected amount of time, allocated to the user indefinitely or allocated to the user according to a fee paid by the user. Information for fee payment may be provided in the user request or provided through other methods and/or at a different time other than upon transmitting the user request for a virtual closet.

In some embodiments, the wardrobe manager 300 is configured to transmit to the communication device from which the user transmitted the request information indicative of a confirmation that the user request has been received. In other embodiments, the wardrobe manager 300 is configured to transmit to the communication device information indicative of a confirmation that the one or more requested virtual closets have been created.

By way of example, but not limitation, the user request may include information indicative of a desire to create two virtual closets with the first virtual closet being a pants closet and the second virtual closet being a hat closet. The wardrobe manager 300 is configured to receive the user request and allocate storage space for two virtual closets associated with the user.

In some embodiments, the wardrobe manager 300 includes a computer program product, memory and a processor. In some embodiments, the computer program product is stored on the memory. The executable code of the computer program product may be processed by the processor for performing one or more functions related to electronic user wardrobe management.

In some embodiments, the wardrobe manager 300 is configured to access a computer program product located at a location remote from the wardrobe manager 300.

In some embodiments, the wardrobe manager 300 includes circuitry configured for performing one or more functions related to electronic user wardrobe management. In some embodiments, the circuitry is located at a location remote from the wardrobe manager 300.

In some embodiments, the wardrobe manager 300 is configured to receive a request for a webpage associated with the electronic user wardrobe management system, retrieve information indicative of the webpage and transmit information indicative of the webpage. The request may be made by a user at the user's communication device and transmitted over the network to the wardrobe manager 300. In some embodiments, the wardrobe manager 300 is configured to receive the request for the webpage, retrieve information indicative of a file indicative of the webpage and transmit information indicative of the webpage. The information may be transmitted to the communication device for display of the webpage on its display device.

In some embodiments, the user transmits and the wardrobe manager 300 is configured to receive, inputs for altering the web page that the user is requesting. By way of example but not limitation, the user may alter the webpage by transmitting an input for arranging images on the webpage in a horizontally or vertically stacked configuration or for horizontally or vertically scrolling the images to be displayed on the webpage. The user may transmit this input to the web server in any number of suitable ways. In one embodiment, the user views the current version of the webpage and selects images to stack. The user may select the image in any number of suitable ways including, but not limited to, dragging and dropping the image in a position on the webpage, clicking on the image with a cursor, selecting the user with the user's touch on a touch screen or issuing an audible command that can be processed by the communication device and transmitted to the web server. In some embodiments, the web server is configured to receive the user input, execute a file associated with the current version of the webpage and transmit to the communication device information indicative of an updated webpage. The webpage may be updated according to the user input.

In various embodiments, user wardrobe requests may be related to one or more of: organization of wardrobe items, arrangement of wardrobe items, display of wardrobe items, purchase of wardrobe items or management of wardrobe group functions. All such requests are envisaged herein.

One embodiment of a method of a wardrobe manager 300 performing electronic user wardrobe management is as follows. The wardrobe manager 300 receives a user request related to user wardrobe management. The wardrobe manager 300 processes the user request. The wardrobe manager 300 then generates information indicative of the processed user request. In some embodiments, the wardrobe manager 300 stores the generated information. In some embodiments, the wardrobe manager 300 updates a file corresponding to a webpage associated with the user. In some embodiments, the wardrobe manager 300 transmits to the communication device information indicative of a webpage that is indicative of the user request.

One embodiment of a method of a wardrobe manager 300 performing electronic user wardrobe management is as follows. The wardrobe manager 300 receives and processes information related to an electronic wardrobe management function. The wardrobe manager 300 performs the electronic wardrobe management function associated with the information. In some embodiments, the wardrobe manager 300 transmits information indicative of a webpage. The contents of the webpage may be indicative of the function.

The input may be received from a user that may be located at the communication device or at a location remote from the communication device. Alternately, the input may be received from the wardrobe manager 300 or from any other element of the system.

Figure 4:
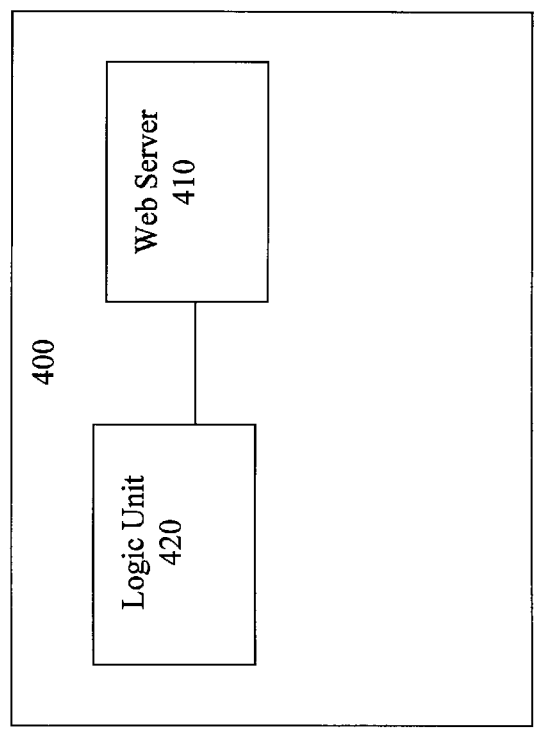
FIG. 4 is a schematic block diagram of a wardrobe manager of the user wardrobe management system of FIG. 1 according to another embodiment of the invention.

FIG. 4 is a schematic block diagram of a wardrobe manager 400 of the user wardrobe management system of FIG. 1 according to another embodiment of the invention. In some embodiments, the wardrobe manager 400 includes a web server 410 and a logic unit 420. In some embodiments, the wardrobe manager 400 is merely configured to communicate with the web server 410 and the logic unit 420 but does not include the web server 410 and the logic unit 420.

In some embodiments, the web server 410 is coupled to the logic unit 420. In some embodiments, the web server 410 is configured to receive a request for a webpage, retrieve information indicative of the webpage and transmit information indicative of the webpage. The request may be made by a user at a communication device and transmitted over the network to the web server 410. In some embodiments, the web server 410 is configured to receive the request for the webpage, retrieve a file indicative of the webpage and transmit information indicative of the webpage.

In some embodiments, the web server 410 is configured to process inputs for altering the web page that the user is requesting. By way of example, but not limitation, the user may alter the webpage by transmitting an input for arranging images on the webpage in a horizontally or vertically stacked configuration or for horizontally or vertically scrolling the images to be displayed on the webpage. The user may transmit this input to the web server 410 in any number of suitable ways. In some embodiments, the web server 410 is configured to receive the user input, execute a file associated with a current version of the webpage and transmit to the communication device information indicative of an updated webpage. The webpage may be updated according to the user input.

In some embodiments, the system webpage is a webpage that can be viewed on the display device of the communication device of any user that has requested the public webpage. In some embodiments, the system webpage is a webpage that can be viewed on the display device of the communication device of any user that has requested the public webpage and is a member of the user wardrobe management system. A user may become a member of the user wardrobe management system in any number of ways as dictated by the user wardrobe management system designer including, but not limited to, through payment of a membership fee or through merely signing up for membership.

In some embodiments, the system webpage is a webpage associated with the user wardrobe management system. In some embodiments, the system webpage includes one or more linked webpages that displays text and/or graphical information including, but not limited to, names of online and brick and mortar retail stores, images of wardrobe items that the retailer may offer for sale or coupons provided by the user wardrobe management system for discounts off the purchase price of wardrobe items. In some embodiments, the system webpage also includes an interface configured to allow a user to be connected to an online webpage associated with a retailer. The interface may be the image and the user may access the retailer webpage by selecting the image. In other embodiments, the interface may be any suitable interface as is known to those skilled in the art. The user may purchase one or more wardrobe items offered by the retailer at an online or a brick and mortar store associated with the retailer.

In some embodiments, the public webpage may also include an interface configured to allow a user to be connected to a public user webpage of the user or of another user whom has a webpage associated with the user wardrobe management system. In some embodiments, the public webpage may also include an interface configured to allow a user to be connected to a public or a private user webpage of the user or of another user whom has a webpage associated with the user wardrobe management system.

In some embodiments, a private user webpage may be accessed only by a user with whom the webpage is associated. The user may be associated with the webpage by creating the webpage. In some embodiments, the private user webpage may be accessed only by any user associated with the user wardrobe management system. In some embodiments, the private user webpage may be accessed only by any user on the internet.

In some embodiments, the private user webpage displays one or more of: one or more virtual closets associated with the user and items stored by the user in the one or more virtual closets, stacking of one or more virtual closets or one or more items in the one or more virtual closets, a user input repository for scrolling images of wardrobe items, a grid for displaying an image in an enlarged view, a page section for creating one or more outfits, a user input repository for initiating a purchase of a wardrobe item.

In some embodiments, the public user webpage may be accessed only by a user with whom the webpage is associated. The user may be associated with the webpage by creating the webpage. In some embodiments, the public user webpage may be accessed only by any user associated with the user wardrobe management system. In some embodiments, the public user webpage may be accessed only by any user on the internet.

In some embodiments, the webpage displays one or more of: one or more outfits created by the user, images of wardrobe items for sale by the user, images of wardrobe items that the user likes and may own or may not own, an area for electronic chatting, user biographical or other information.

Referring back to FIG. 4, the wardrobe manager 400 also includes a logic unit. The logic unit 420 is coupled to the web server 410. In some embodiments, the logic unit includes a processor and a memory and computer program product including instructions stored on the memory and adapted to cause the processor to perform as the logic 320 of the wardrobe manager described with reference to FIG. 3. In some embodiments, the logic unit includes a computer program product including instructions accessible by the processor and configured to cause the processor to perform as the logic 320 of the wardrobe manager described with reference to FIG. 3. In some embodiments, the logic unit includes circuitry configured to receive and process user wardrobe management requests. In other embodiments, the logic unit includes a system including circuitry and including a computer program product for receiving and processing user wardrobe management requests. Accordingly, the logic unit may be implemented in software, hardware or a combination of software and hardware. The memory may be any type of suitable memory.

In some embodiments, a computer program product includes executable code that may be processed by a processor for performing one or more functions related to electronic user wardrobe management.

It should be noted that although the methods described herein describe a specific order of steps, it is understood that the order of these steps may differ from what is depicted. Also two or more steps may be performed concurrently or with partial concurrence. Such variation will depend on the software and hardware systems chosen and on designer choice. It is understood that all such variations are within the scope of the invention. Likewise, software and web implementations of the present invention could be accomplished with standard programming techniques with rule based logic and other logic to accomplish the various electronic user wardrobe management functions.

Embodiments of the invention may be practiced in distributed computing environments where tasks are performed by local and remote processing devices that are linked (either by hardwired links, wireless links, or by a combination of hardwired or wireless links) through the network. In a distributed computing environment, any computer program products may be located in both local and remote memory.

The foregoing description of embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principals of the invention and its practical application to enable one skilled in the art to utilize the invention in various embodiments and with various modifications as are suited to the particular use contemplated.

While the invention has been described in terms of exemplary embodiments, it is to be understood that the words which have been used are words of description and not of limitation. As is understood by persons of ordinary skill in the art, a variety of modifications can be made without departing from the scope of the invention defined by the following claims, which should be given their fullest, fair scope.

What is claimed is:

1. A method of managing electronic items, comprising:
    receiving user-owned images of items and storing the user-owned images of items in a plurality of virtual closets, each of the plurality of virtual closets being associated with a specific position in a stack, the stack having a plurality of positions;
    storing retailer-owned images of items in the plurality of virtual closets;
    displaying a plurality of images in each of the positions of the stack, each displayed plurality of images in a first position of the stack being selected from a first virtual closet of the plurality of virtual closets corresponding with the positions in the stack and being items of a first type, and each displayed plurality of images in a second position of the stack being selected from a second virtual closet of the plurality of virtual closets corresponding with the positions in the stack and being items of a second type associated with the items of the first type;
    displaying tags in association with each of the displayed images, the tags containing user-specified information about the items in the images, the information specified being one or more of color, shade, pattern, shape, price, style time period, material type, specific seasonal time period of year, size or dress code category so as to facilitate comparison of the displayed images; and
    allowing a user to change the displayed plurality of images in at least one of the positions in the stack by scrolling so that a user can determine whether items in the first position in the stack coordinate with items in the second position in the stack.

2. The method of managing electronic items as claimed in claim 1, further comprising:
    allowing a user to select user-selected images for display in a subset of the positions in the stack; and
    selecting system-selected images randomly for display in a remaining subset of the positions in the stack.

3. The method of managing electronic items as claimed in claim 1, further comprising:
    allowing a user to select user-selected images for display in a subset of the positions in the stack; and
    selecting system-selected images for display in a remaining subset of the positions in the stack by determining which of the system-selected images match with the user-selected images in the stack.

4. The method of managing electronic items as claimed in claim 3, wherein determining which of the system-selected images match with the user-selected images in the stack comprises comparing colors, shades, patterns, shapes, and stack position of system-selected images with colors, shades, patterns, shapes, and positions of the user-selected images.

5. The method of managing electronic items as claimed in claim 1, wherein the stack is a vertical stack.

6. The method of managing electronic items as claimed in claim 1, wherein the stack is a horizontal stack.

7. The method of managing electronic items as claimed in claim 1, further comprising:
allowing a user to change a layout of the stack to a vertical layout, a horizontal layout, or another layout arrangement.

8. The method of managing electronic items as claimed in claim 1, wherein the electronic items are images of wardrobe, furniture, apparel, accessory, room decor, or other physical items.

9. The method of managing electronic items as claimed in claim 1, wherein the electronic items are wardrobe items, and each of the plurality of virtual closets are also associated with a type of clothing or accessory, or a color, shade, pattern, shape, price, style time period, material type, specific seasonal time period of year, size, or dress code category.

10. The method of managing electronic items as claimed in claim 1, wherein each of the plurality of virtual closets may be sorted by color, shade, pattern, shape, price, style time period, material type, specific seasonal time period of year, size, dress code category, or another defining item characteristic.

11. The method of managing items as claimed in claim 1, further comprising:
assisting the user to purchase an item shown in a retailer-owned image.

12. The method of managing items as claimed in claim 11, further comprising:
providing a coupon that can be applied to the purchase of the item shown in the retailer-owned image.

13. An electronic item management system, comprising:
a processor;
a memory operably coupled to the processor, the memory having program instructions stored therein, the processor being operable to execute the program instructions, the program instructions including:
instructions for receiving user-owned images of items and storing the user-owned images of items in a plurality of virtual closets, each of the plurality of virtual closets being associated with a specific position in a stack, the stack having a plurality of positions;
instructions for storing retailer-owned images of items in the plurality of virtual closets;
instructions for displaying a plurality of images in each of the positions of the stack, each displayed plurality of images in a first position of the stack being selected from a first virtual closet of the plurality of virtual closets corresponding with the positions in the stack and being items of a first type, and each displayed plurality of images in a second position of the stack being selected from a second virtual closet of the plurality of virtual closets corresponding with the positions in the stack and being items of a second type associated with the items of the first type;
instructions for displaying tags in association with each of the displayed images, the tags containing user-specified information about the items in the images, the information specified being one or more of color, shade, pattern, shape, price, style time period, material type, specific seasonal time period of year, size or dress code category so as to facilitate comparison of the displayed images; and
instructions for allowing a user to change the displayed plurality of images in at least one of the positions in the stack by scrolling so that a user can determine whether items in the first position in the stack coordinate with items in the second position in the stack.

14. The electronic item management system as claimed in claim 13, the program instructions further comprising:
instructions for allowing a user to select user-selected images for display in a subset of the positions in the stack; and
instructions for selecting system-selected images randomly for display in a remaining subset of the positions in the stack.

15. The electronic item management system as claimed in claim 13, the program instructions further comprising:
instructions for allowing a user to select user-selected images for display in a subset of the positions in the stack; and
instructions for selecting system-selected images for display in a remaining subset of the positions in the stack by determining which of the system-selected images match with the user-selected images in the stack.

16. The electronic item management system as claimed in claim 15, wherein the instructions for determining which of the system-selected images match with the user-selected images in the stack comprises instructions for comparing colors, shades, patterns, shapes, and stack position of system-selected images with colors, shades, patterns, shapes, and positions of the user-selected images.

17. The electronic item management system as claimed in claim 13, wherein the stack is a vertical stack.

18. The electronic item management system as claimed in claim 13, wherein the stack is a horizontal stack.

19. The electronic item management system as claimed in claim 13, the program instructions further comprising:
instructions for allowing a user to change a layout of the stack to a vertical layout, a horizontal layout, or another layout arrangement.

20. The electronic item management system as claimed in claim 13, wherein the electronic items are images of wardrobe, furniture, apparel, accessory, room decor, or other physical items.

21. The electronic item management system as claimed in claim 13, wherein the electronic items are wardrobe items, and each of the plurality of virtual closets are also associated with a type of clothing or accessory, or a color, shade, pattern, shape, price, style time period, material type, specific seasonal time period of year, size, or dress code category.

22. The electronic item management system as claimed in claim 13, the program instructions further comprising:
instructions for sorting each of the plurality of virtual closets by color, shade, pattern, shape, price, style time period, material type, specific seasonal time period of year, size, dress code category, or another defining item characteristic.

23. A method of managing electronic items, comprising:
receiving images of items;
storing the images of items in a plurality of virtual closets, each of the plurality of virtual closets being associated with a specific position in a stack, the stack having a plurality of positions;
displaying a plurality of images in each of the positions of the stack, each displayed plurality of images in a first position of the stack being selected from a first virtual closet of the plurality of virtual closets corresponding with the positions in the stack and being items of a first type, and each displayed plurality of images in a second position of the stack being selected from a second virtual closet of the plurality of virtual closets corresponding with the positions in the stack and being items of a second type associated with the items of the first type; and allowing a user to change the displayed plurality of images in at least one of the positions in the stack by scrolling so that a user can determine whether items in the first position in the stack coordinate with items in the second position in the stack.

24. The method of managing electronic items as claimed in claim 23, further comprising:

allowing a user to select user-selected images for display in a subset of the positions in the stack; and selecting system-selected images randomly for display in a remaining subset of the positions in the stack, the system-selected images being selected randomly from the virtual closets corresponding with the remaining subset of positions in the stack.

25. The method of managing electronic items as claimed in claim 23, further comprising:

allowing a user to select user-selected images for display in a subset of the positions in the stack; and selecting system-selected images for display in a remaining subset of the positions in the stack by determining which of the system-selected images match with the user-selected images in the stack, the system-selected images being selected from the virtual closets corresponding with the remaining subset of positions in the stack.

26. The method of managing electronic items as claimed in claim 25, wherein determining which of the system-selected images match with the user-selected images in the stack comprises comparing colors, shades, patterns, shapes, and stack position of the user-selected images with colors, shades, patterns, shapes, and stack position of the system-selected images.

27. The method of managing electronic items as claimed in claim 23, wherein the stack is a vertical stack.

28. The method of managing electronic items as claimed in claim 23, wherein the stack is a horizontal stack.

29. The method of managing electronic items as claimed in claim 23, further comprising:

allowing a user to change a layout of the stack to a vertical layout, a horizontal layout, or another layout arrangement.

30. The method of managing electronic items as claimed in claim 23, wherein the electronic items are wardrobe items, and each of the plurality of virtual closets are also associated with a type of clothing or accessory, or a color, shade, pattern, shape, price, style time period, material type, specific seasonal time period of year, size, or dress code category.

31. The method of managing electronic items as claimed in claim 23, wherein each of the plurality of virtual closets may be sorted by color, shade, pattern, shape, price, style time period, material type, specific seasonal time period of year, size, dress code category, or another defining item characteristic.

32. The method of managing electronic items as claimed in claim 23, further comprising:

assisting the user to purchase an item shown in an image.

33. The method of managing electronic items as claimed in claim 32, further comprising:

providing a coupon that can be applied to the purchase of the item shown in the image.

34. An electronic item management system, comprising:

a processor;

a memory operably coupled to the processor, the memory having program instructions stored therein, the processor being operable to execute the program instructions, the program instructions including:

instructions for receiving images of items;

instructions for storing the images of items in a plurality of virtual closets, each of the plurality of virtual closets being associated with a specific position in a stack, the stack having a plurality of positions;

instructions for displaying a plurality of images in each of the positions of the stack, each displayed plurality of images in a first position of the stack being selected from a first virtual closet of the plurality of virtual closets corresponding with the positions in the stack and being items of a first type, and each displayed plurality of images in a second position of the stack being selected from a second virtual closet of the plurality of virtual closets corresponding with the positions in the stack and being items of a second type associated with the items of the first type; and instructions for allowing a user to change the displayed plurality of images in at least one of the positions in the stack by scrolling so that a user can determine whether items in the first position in the stack coordinate with items in the second position in the stack.

35. The electronic item management system as claimed in claim 34, the program instructions further comprising:

instructions for allowing a user to select user-selected images for display in a subset of the positions in the stack; and instructions for selecting system-selected images randomly for display in a remaining subset of the positions in the stack, the system-selected images being selected randomly from the virtual closets corresponding with the remaining subset of positions in the stack.

36. The electronic item management system as claimed in claim 34, the program instructions further comprising:

instructions for allowing a user to select user-selected images for display in a subset of the positions in the stack; and instructions for selecting system-selected images for display in a remaining subset of the positions in the stack by determining which of the system-selected images match with the user-selected images in the stack, the system-selected images being selected from the virtual closets corresponding with the remaining subset of positions in the stack.

37. The electronic item management system as claimed in claim 36, wherein the instructions for determining which of the system-selected images match with the user-selected images in the stack comprises instructions for comparing colors, shades, patterns, shapes, and stack position of the user-selected images with colors, shades, patterns, shapes, and stack position of the system-selected images.

38. The electronic item management system as claimed in claim 34, wherein the stack is a vertical stack.

39. The electronic item management system as claimed in claim 34, wherein the stack is a horizontal stack.

40. The electronic item management system as claimed in claim 34, the program instructions further comprising:

instructions for allowing a user to change a layout of the stack to a vertical layout, a horizontal layout, or another layout arrangement.

41. The electronic item management system as claimed in claim 34, wherein the electronic items are wardrobe items, and each of the plurality of virtual closets are also associated with a type of clothing or accessory, or a color, shade, pattern, shape, price, style time period, material type, specific seasonal time period of year, size, or dress code category.

42. The electronic item management system as claimed in claim 34, the program instructions further comprising:
  instructions for sorting each of the plurality of virtual closets by color, shade, pattern, shape, price, style time period, material type, specific seasonal time period of year, size, dress code category, or another defining item characteristic.

* * * * *